US010359691B2

(12) United States Patent
Egawa

(10) Patent No.: US 10,359,691 B2
(45) Date of Patent: Jul. 23, 2019

(54) ILLUMINATOR AND PROJECTOR

(71) Applicant: SEIKO EPSON CORPORATION, Tokyo (JP)

(72) Inventor: Akira Egawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 14 days.

(21) Appl. No.: 15/916,165

(22) Filed: Mar. 8, 2018

(65) Prior Publication Data
US 2018/0275495 A1    Sep. 27, 2018

(30) Foreign Application Priority Data

Mar. 27, 2017 (JP) ................. 2017-060592

(51) Int. Cl.
 G03B 21/16    (2006.01)
 G03B 21/20    (2006.01)
 G02B 7/02     (2006.01)

(52) U.S. Cl.
 CPC ............ G03B 21/16 (2013.01); G02B 7/028 (2013.01); G03B 21/2073 (2013.01); G03B 21/204 (2013.01); G03B 21/208 (2013.01); G03B 21/2013 (2013.01); G03B 21/2066 (2013.01)

(58) Field of Classification Search
 CPC .... G02B 7/028; G03B 21/16; G03B 21/2013; G03B 21/204; G03B 21/2073; G03B 21/2066; G03B 21/208

USPC ...................................... 353/57–61
See application file for complete search history.

(56) References Cited

U.S. PATENT DOCUMENTS

2003/0081180 A1* 5/2003 Suzuki ................ H04N 9/3105
                                                     353/31
2005/0122481 A1* 6/2005 Yamasaki .............. H04N 9/315
                                                     353/31
2012/0140183 A1  6/2012 Tanaka et al.

FOREIGN PATENT DOCUMENTS

JP    2007171872 A  * 7/2007 ............. G03B 21/00
JP    2012-137744 A    7/2012

OTHER PUBLICATIONS

Machine Translation of Minato JP 2007171872 A.*

* cited by examiner

Primary Examiner — Steven Whitesell Gordon
Assistant Examiner — Jerry L Brooks
(74) Attorney, Agent, or Firm — Oliff PLC

(57) ABSTRACT

An illuminator includes a light source that emits light containing a predetermined polarized light component, an optical element that transmits the light emitted from the light source, a polarization separation element on which the light having passed through the optical element is incident and which performs polarization separation on the incident light, and a temperature adjuster that adjusts the temperature of the optical element.

16 Claims, 7 Drawing Sheets

TEMPERATURE DISTRIBUTION

INTERNAL STRESS DISTRIBUTION

ILLUMINATOR AND PROJECTOR

BACKGROUND

1. Technical Field

The present invention relates to an illuminator and a projector.

2. Related Art

As an illuminator for a projector, there is a known illuminator in which fluorescence produced by exciting a phosphor with excitation light emitted from a solid-state light source is used as illumination light (JP-A-2012-137744, for example). In the illuminator, the light emitted from the solid-state light source passes through a half-wave plate, which converts the light into light containing S-polarized light and P-polarized light, and the converted light is incident on a dichroic mirror (polarization separation element). Out of the light incident on the dichroic mirror, the light formed of the P-polarized light component passes through the dichroic mirror, and the light formed of the S-polarized light is reflected off the dichroic mirror. In the illuminator, the polarization ratio of the light incident on the dichroic mirror is controlled by adjustment of the angle of rotation of the half-wave plate.

In the illuminator described above, however, a mechanism that rotates the half-wave plate is used to change the polarization ratio of the light incident on the polarization separation element, undesirably resulting in an increase in cost.

SUMMARY

An advantage of some aspects of the invention is to provide a low-cost illuminator capable of controlling the polarization ratio of light incident on a polarization separation element. Another advantage of some aspects of the invention is to provide a projector including the illuminator.

According to a first aspect of the invention, an illuminator is provided. The illuminator includes a light source that emits light containing a predetermined polarized light component, an optical element that transmits the light emitted from the light source, a polarization separation element on which the light having passed through the optical element is incident and which performs polarization separation on the incident light, and a temperature adjuster that adjusts a temperature of the optical element.

The illuminator according to the first aspect can control the polarization state of the light incident on the polarization separation element by using the simple configuration in which the temperature of the optical element is adjusted.

In the first aspect, it is preferable that the temperature adjuster is a fan, and that the fan cools the optical element in such a way that the temperature thereof is kept at a predetermined temperature.

According to the configuration described above, disturbance of the polarization state due to thermal distortion of the optical element can be reduced.

In the first aspect, it is preferable that the temperature adjuster controls a polarization ratio in the optical element by producing a temperature difference in the optical element.

According to the configuration described above, the polarization ratio can be controlled by controlling the temperature of the optical element. Cost reduction is achieved as compared with a configuration in which a rotatable half-wave plate is used.

In the first aspect, it is preferable that the illuminator further includes a light detector that detects illumination light and a controller that controls the temperature adjuster based on a result of detection performed by the light detector.

According to the configuration described above, the temperature of the optical element can be adjusted based on the color balance of the illumination light. The temperature of the optical element can therefore be controlled with accuracy.

According to a second aspect of the invention, a projector is provided. The projector includes the illuminator according to the first aspect, a light modulator that modulates illumination light from the illuminator in accordance with image information to produce image light, and a projection system that projects the image light.

The projector according to the second aspect, which includes the illuminator capable of controlling the polarization ratio at low cost, allows reduction in the cost of the projector itself.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
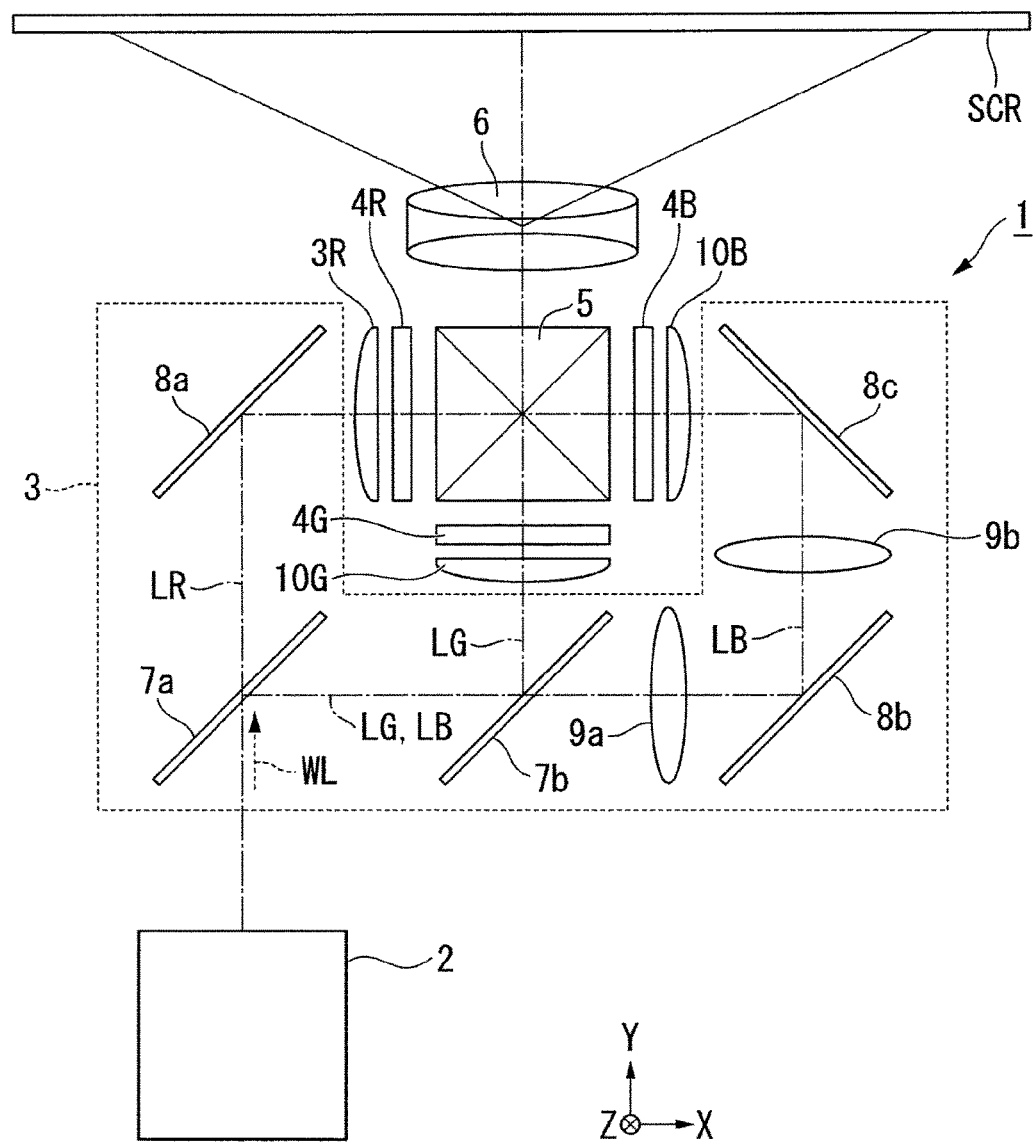
FIG. 1 shows a schematic configuration of a projector according to a first embodiment.

Embodiments of the invention will be described below in detail with reference to the drawings.

In the drawings used in the following description, a characteristic portion is enlarged for convenience in some cases for clarity of the characteristic thereof, and the dimension ratio and other factors of each component are therefore not always equal to actual values.

First Embodiment

An example of a projector according to a first embodiment will first be described.

FIG. 1 shows a schematic configuration of the projector according to the present embodiment.

A projector 1 according to the present embodiment is a projection-type image display apparatus that displays color video images on a screen SCR, as shown in FIG. 1. The projector 1 includes an illuminator 2, a color separation system 3, light modulators 4R, 4G, and 4B, a light combining system 5, and a projection system 6.

The color separation system 3 separates illumination light WL into red light LR, green light LG, and blue light LB. The color separation system 3 generally includes a first dichroic mirror 7a and a second dichroic mirror 7b, a first total reflection mirror 8a, a second total reflection mirror 8b, and a third total reflection mirror 8c, and a first relay lens 9a and a second relay lens 9b.

The first dichroic mirror 7a separates the illumination light WL from the illuminator 2 into the red light LR and the other light fluxes (green light LG and blue light LB). The first dichroic mirror 7a transmits the separated red light LR and reflects the other light fluxes (green light LG and blue light LB). On the other hand, the second dichroic mirror 7b reflects the green light LG and transmits the blue light LB to separate the other light fluxes into the green light LG and the blue light LB.

The first total reflection mirror 8a is disposed in the optical path of the red light LR and reflects the red light LR having passed through the first dichroic mirror 7a toward the light modulator 4R. On the other hand, the second total reflection mirror 8b and the third total reflection mirror 8c are disposed in the optical path of the blue light LB and guide the blue light LB having passed through the second dichroic mirror 7b to the light modulator 4B. The green light LG is reflected off the second dichroic mirror 7b toward the light modulator 4G.

The first relay lens 9a and the second relay lens 9b are disposed in the optical path of the blue light LB and on the light exiting side of the second total reflection mirror 8b. The first relay lens 9a and the second relay lens 9b have the function of compensating optical loss of the blue light LB due to the fact that the optical path of the blue light LB is longer than the optical paths of the red light LR and the green light LG.

The light modulator 4R modulates the red light LR in accordance with image information to form image light corresponding to the red light LR. The light modulator 4G modulates the green light LG in accordance with image information to form image light corresponding to the green light LG. The light modulator 4B modulates the blue light LB in accordance with image information to form image light corresponding to the blue light LB.

The light modulators 4R, 4G, and 4B are each formed, for example, of a transmissive liquid crystal panel. Polarizers (not shown) are disposed on the light incident side and the light exiting side of each of the liquid crystal panels.

Field lenses 10R, 10G, and 10B are disposed on the light incident side of the light modulators 4R, 4G, and 4B, respectively. The field lenses 10R, 10G, and 10B respectively parallelize the red light LR, the green light LG, and the blue light LB incident on the light modulators 4R, 4G, and 4B.

The image light fluxes from the light modulators 4R, 4G, and 4B enter the light combining system 5. The light combining system 5 combines the image light fluxes corresponding to the red light LR, the green light LG, and the blue light LB with one another and directs the combined image light toward the projection system 6. The light combining system 5 is, for example, a cross dichroic prism.

The projection system 6, which is formed of a projection lens group, enlarges the combined image light from the light combining system 5, and projects the enlarged image light toward the screen SCR. Enlarged color video images are thus displayed on the screen SCR.

Illuminator

Figure 2:
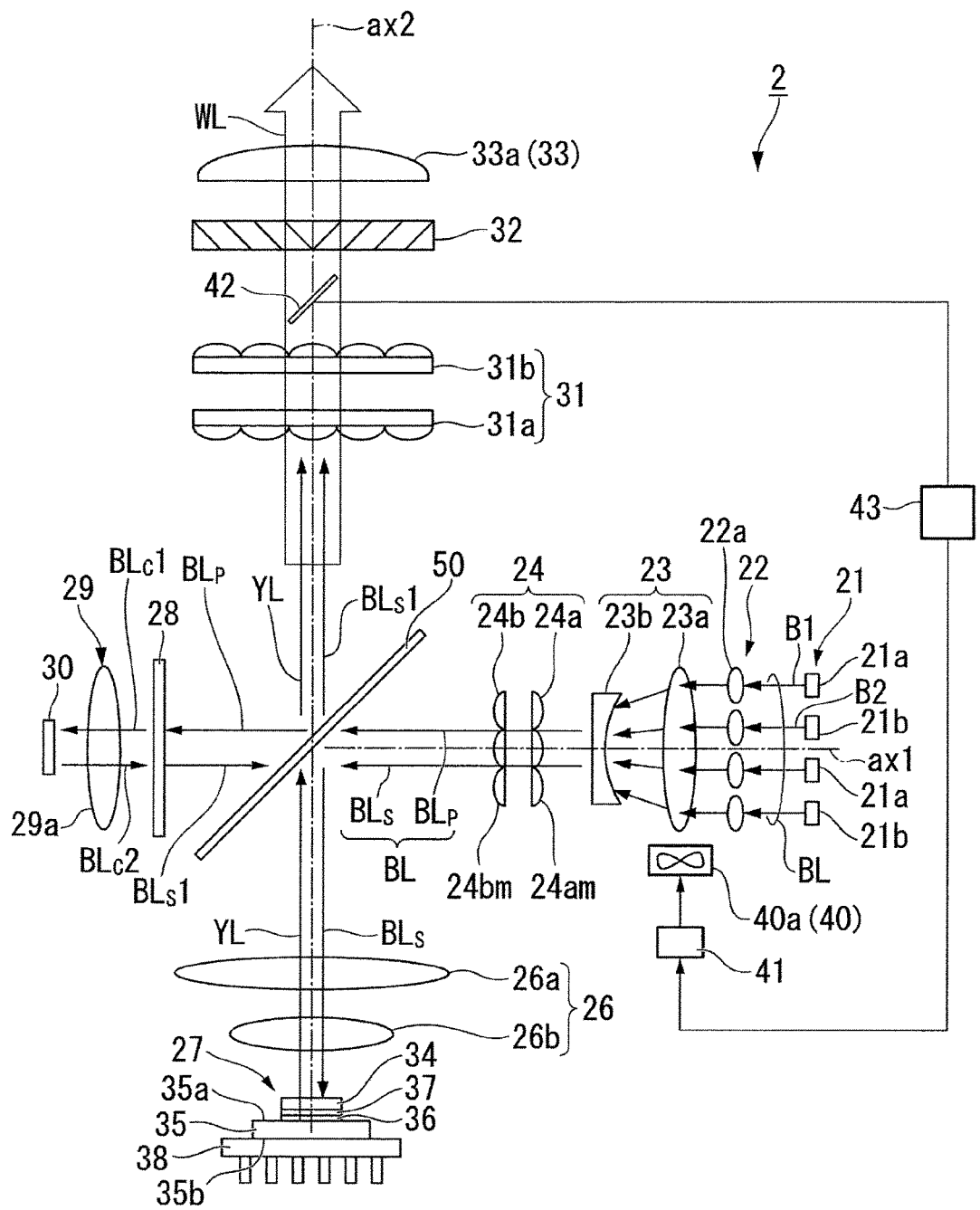
FIG. 2 shows a schematic configuration of an illuminator.

The illuminator 2 according to an embodiment of the invention will be subsequently described. FIG. 2 shows a schematic configuration of the illuminator 2. The illuminator 2 includes an array light source 21, a collimator system 22, an afocal system 23, a homogenizer system 24, a polarization separation element 50, a first light collection system 26, a fluorescence emitting element 27, a retardation film 28, a second light collection system 29, a diffusive reflection element 30, an optical integration system 31, a polarization conversion element 32, and a superimposing lens 33a, as shown in FIG. 2.

In the present embodiment, the optical integration system 31 and the superimposing lens 33a form a superimposing system 33.

The array light source 21, the collimator system 22, the afocal system 23, the homogenizer system 24, the polarization separation element 50, the retardation film 28, the second light collection system 29, and the diffusive reflection element 30 are sequentially arranged along an optical axis ax1. On the other hand, the fluorescence emitting element 27, the first light collection system 26, the polarization separation element 50, the optical integration system 31, the polarization conversion element 32, and the superimposing system 33a are sequentially arranged along an optical axis ax2. The optical axis ax1 and the optical axis ax2 are present in the same plane and perpendicular to each other.

The array light source 21 includes a plurality of first semiconductor lasers 21a and a plurality of second semiconductor lasers 21b. The plurality of first semiconductor lasers 21a are arranged in an array in a plane perpendicular to the optical axis ax1. The first semiconductor lasers 21a each emit, for example, a blue light ray B1 (laser beam having a peak wavelength of 460 nm, for example). In the present embodiment, the light ray B1 emitted from each of the first semiconductor lasers 21a corresponds to light formed of a P-polarized light component with respect to the polarization separation element 50, which will be described later.

Similarly, the plurality of second semiconductor lasers 21b are arranged in an array in a plane perpendicular to the optical axis ax1. The second semiconductor lasers 21b each emit, for example, a blue light ray B2 (laser beam having a peak wavelength of 460 nm, for example). In the present embodiment, the light ray B2 emitted from each of the second semiconductor lasers 21b corresponds to light formed of an S-polarized light component with respect to the polarization separation element 50, which will be described later.

Based on the configuration described above, the array light source 21 outputs a light ray flux BL formed of the plurality of light rays B1 and B2. The light ray flux BL is formed of light containing the P-polarized light component (light rays B1) and the S-polarized light component (light rays B2). In the present embodiment, the array light source 21 corresponds to the "light source" in the appended claims, and the light ray flux BL corresponds to the "light containing a predetermined polarized light component" in the appended claims.

The light ray flux BL outputted from the array light source 21 is incident on the collimator system 22. The collimator system 22 converts the light ray flux BL outputted from the array light source 21 into parallelized light. The collimator system 22 is formed, for example, of a plurality of collimator lenses 22a arranged in an array. The plurality of collimator lenses 22a are disposed in correspondence with the plurality of first semiconductor lasers 21a and second semiconductor lasers 21b.

The light ray flux BL having passed through the collimator system 22 enters the afocal system 23. The afocal system 23 adjusts the light flux diameter of the light ray flux BL.

The afocal system 23 is formed, for example, of a convex lens 23a and a concave lens 23b.

The light ray flux BL having passed through the afocal system 23 enters the homogenizer system 24. The homogenizer system 24 cooperates with the first light collection system 26 to homogenize the optical illuminance distribution on a phosphor layer 34. The homogenizer system 24 further cooperates with the second light collection system 29 to homogenize the optical illuminance distribution on the diffusive reflection element 30, which will be described later. The homogenizer system 24 is formed, for example, of a first lens array 24a and a second lens array 24b. The first lens array 24a includes a plurality of first lenslets 24am, and the second lens array 24b includes a plurality of second lenslets 24bm. The plurality of second lenslets 24bm correspond to the plurality of first lenslets 24am.

The light having passed through the homogenizer system 24 is incident on the polarization separation element 50. The polarization separation element 50 is formed, for example, of a wavelength selective dichroic prism. The polarization separation element 50 is so disposed as to incline by 45° with respect to the optical axes ax1 and ax2.

The polarization separation element 50 has a polarization separation function of separating the light ray flux BL into a light ray flux BLs (formed of plurality of light rays B2 described above), which is formed of the S-polarized light component with respect to the polarization separation element 50, and a light ray flux BLp (formed of plurality of light rays B1 described above), which is formed of the P-polarized light component with respect to the polarization separation element 50. Specifically, the polarization separation element 50 reflects the light ray flux BLs formed of the S-polarized light component and transmits the light ray flux BLp formed of the P-polarized light component.

The polarization separation element 50 further has a color separation function of transmitting fluorescence YL, which belongs to a wavelength band different from the wavelength band to which the light ray flux BL belongs, irrespective of the polarization state of the fluorescence YL.

The S-polarized light ray flux BLs having exited out of the polarization separation element 50 enters the first light collection system 26. The first light collection system 26 collects the light ray flux BLs and causes the collected light ray flux BLs to travel as excitation light toward the phosphor layer 34. The light ray flux BLs is used to produce the fluorescence YL, as will be described later.

In the present embodiment, the first light collection system 26 is formed, for example, of a first lens 26a and a second lens 26b. The light having exited out of the first light collection system 26 is incident in the form of collected light on the fluorescence emitting element 27.

On the other hand, the P-polarized light ray flux BLp having exited out of the polarization separation element 50 is incident on the diffusive reflection element 30 via the second light collection system 29. In the present embodiment, the second light collection system 29 is formed, for example, of a first lens 29a. The light having exited out of the second light collection system 29 is incident in the form of collected light on the diffusive reflection element 30, which produces blue light BLc2, which will be described later, in the form of reflected light.

The above description has been made of an ideal case. That is, the description has been made of a case where the ratio between the S-polarized light and the P-polarized light in the light ray flux BL incident on the polarization separation element 50 does not change from the ratio in the light ray flux BL outputted from the array light source 21. In this case, the light ray flux BLs reflected off the polarization separation element 50 produces a predetermined quantity of fluorescence YL, and the light ray flux BLp having passed through the polarization separation element 50 produces a predetermined quantity of blue light BLs1. That is, the predetermined quantity of fluorescence YL and the predetermined quantity of blue light BLs1 can produce desired illumination light WL.

In practice, however, the ratio between the light fluxes separated by the polarization separation element 50 (light ray flux BLp and blue light BLs) changes in some cases. The tendency of the change in the ratio increases as the intensity of the light outputted from the array light source (light ray flux BL) increases.

The material of the convex lens 23a and the concave lens 23b, which form the afocal system 23, has a nonzero internal absorption factor. In particular, the convex lens 23a, which is located in a position closer to the array light source 21, absorbs part of the laser beam (light rays B1 and B2) outputted from the array light source 21 and therefore generates heat, and a temperature difference is likely to occur in the lens 23a.

The temperature difference having occurred in the convex lens 23a induces internal stress. The convex lens 23a in which the internal stress has been induced produces a phase difference. The convex lens 23a therefore disturbs the polarization state of the light ray flux BL (light rays B1 and B2).

When the polarization state of the light ray flux BL is disturbed, the polarization ratio between the S-polarized light (light ray flux BLs) and the P-polarized light (light ray flux BLp) changes. The change does not allow a fixed ratio between the proportion of the light separated as the S-polarized light (light ray flux BLs) from the light ray flux BL by the polarization separation element 50 and the proportion of the light separated as the P-polarized light (light ray flux BLp) from the light ray flux BL by the polarization separation element 50. That is, the quantity of fluorescence YL usable as the illumination light WL changes, undesirably resulting in a change in the color balance (white balance) of the illumination light WL.

To avoid the situation described above, the illuminator 2 according to the present embodiment controls the polarization state of the light ray flux BL by adjusting the temperature of the convex lens 23a, which forms the afocal system 23. Specifically, the illuminator 2 according to the present embodiment includes a temperature adjuster 40 and a controller 41. In the present embodiment, the convex lens 23a corresponds to the "optical element" in the appended claims.

The temperature adjuster 40 is formed, for example, of a fan 40a. The controller 41 can adjust the temperature of the convex lens 23a by controlling the number of revolutions of the fan 40a.

The controller 41 controls the operation of driving the fan 40a based on the color balance of the illumination light WL. The illuminator 2 according to the present embodiment further includes a light quantity monitoring mirror 42 and a sensor unit 43.

In the present embodiment, the light quantity monitoring mirror 42 is provided in the optical path of the illumination light WL between the optical integration system 31 and the polarization conversion element 32. The light quantity monitoring mirror 42 is so disposed as to incline by 45° with respect to the optical axis ax2. The light quantity monitoring mirror 42 transmits part of the light incident thereon and reflects the remainder. The light having passed through the light quantity monitoring mirror 42 is incident on the polarization conversion element 32, and the light reflected off the light quantity monitoring mirror 42 is incident on the sensor unit 43.

The sensor unit 43 detects the color balance (white balance) of the illumination light WL outputted from the illuminator 2. The illumination light WL is formed of the yellow fluorescence YL and the blue light BLs1, as will be described later. The sensor unit 43 transmits a result of the detection to the controller 41.

The controller 41 operates the temperature adjuster 40 (fan 40a) based on a signal (result of detection of color balance) from the sensor unit 43, such as a detected quantity of the fluorescence YL and a detected quantity of the blue light BLs1. That is, the temperature adjuster 40 adjusts the temperature of the convex lens 23a based on the detection signal from the sensor unit 43. The sensor unit 43 in the present embodiment corresponds to the "light detector" in the appended claims.

The temperature adjuster 40 cools the convex lens 23a in such a way that the temperature thereof is kept at a predetermined temperature. The predetermined temperature used herein corresponds to a temperature that induces thermal distortion (internal stress) small enough not to change the white balance of the illumination light WL in the convex lens 23a. Specifically, the controller 41 determines that thermal distortion has been induced in the convex lens 23a (that is, temperature of convex lens 23a has increased above predetermined temperature) in a case where the controller 41 determines based on the detection signal from the sensor unit 43 that the white balance of the illumination light WL has changed. The controller 41 then drives the temperature adjuster 40 to cool the convex lens 23a in such a way that the temperature is kept at a temperature that does not change the white balance of the illumination light WL.

Based on the configuration described above, the afocal system 23 (convex lens 23a) can cause the light ray flux BL (light rays B1 and B2) to be incident on the polarization separation element 50 with the amount of disturbance of the polarization state of the illumination light WL due to the thermal distortion reduced.

Figure 3:
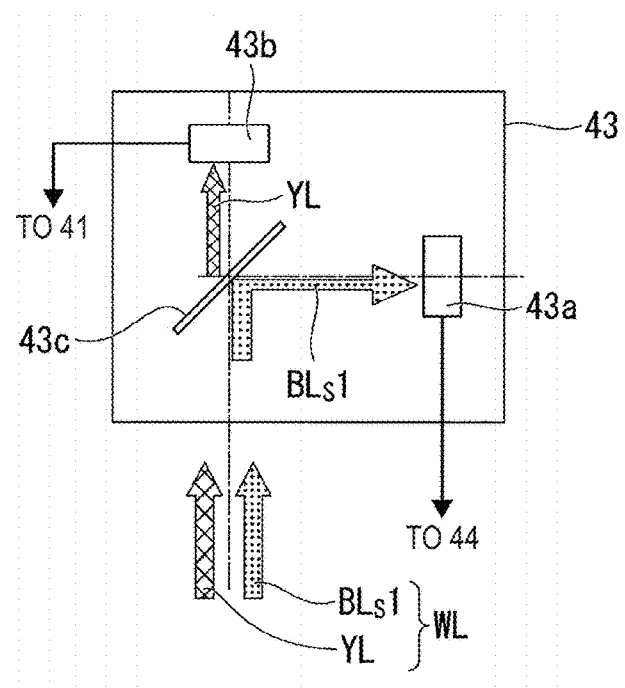
FIG. 3 shows a schematic configuration of a sensor unit.
Figure 4:
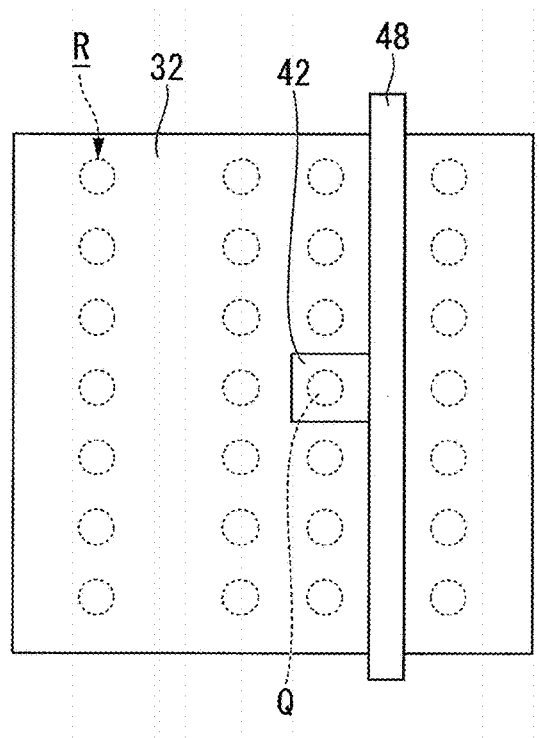
FIG. 4 is a front view showing the arrangement of a mirror in a polarization conversion element.

FIG. 3 shows a schematic configuration of the sensor unit 43. FIG. 4 is a front view showing the arrangement of the mirror in the polarization conversion element 32.

The sensor unit 43 includes a first sensor 43a, a second sensor 43b, and a dichroic mirror 43c, as shown in FIG. 3. The dichroic mirror 43c is formed of a dielectric multilayer film, transmits the fluorescence YL out of the illumination light WL, and reflects the blue light BLs1 out of the illumination light WL.

The first sensor 43a detects the quantity of the blue light BLs1 reflected off the dichroic mirror 43c. The second sensor 43b detects the quantity of the fluorescence YL having passed through the dichroic mirror 43c. The first sensor 43a and the second sensor 43b are electrically connected to the controller 41 and transmit results of the detection to the controller 41. The controller 41 controls the operation of driving the temperature adjuster 40 (fan 40a) based on the results of the detection performed by the first sensor 43a and the second sensor 43b.

The light quantity monitoring mirror 42 is held by a holding member 48, which is so disposed as not to overlap with a plurality of light incident areas R of the polarization conversion element 32, as shown in FIG. 4. The light incident areas R of the polarization conversion element 32 are areas on which a plurality of narrow light fluxes having exited out of the optical integration system 31, which will be described later, are incident.

The light quantity monitoring mirror 42 is disposed in a position where a secondary light source image Q of the illumination light is formed by the second lens array 31b. FIG. 4 shows a case where the light quantity monitoring mirror 42 is disposed in the optical path between the optical integration system 31 and the polarization conversion element 32. In place of the case described above, the light quantity monitoring mirror 42 may be disposed in the optical path between the polarization conversion element 32 and the superimposing lens 33a.

Referring back to FIG. 2, the fluorescence emitting element 27 includes the phosphor layer 34, a support 35, which supports the phosphor layer 34, a fixing member 36, which fixes the phosphor layer 34 to the support 35, a reflector 37, which is provided between the fixing member 36 and the phosphor layer 34, and a heat sink 38, which is provided on a surface 35b of the support 35, which is the surface opposite a surface 35a of the support 35, which is the surface that supports the phosphor layer 34.

The phosphor layer 34 is formed of a phosphor that absorbs the light ray flux BLs and is excited therewith to emit yellow fluorescence. The thus functioning phosphor layer 34 is made of a ceramic material containing a YAG phosphor. The YAG phosphor is formed by sintering a plurality of crystal grains. The phosphor layer 34 excels in heat resistance as compared with a phosphor layer containing an organic binder.

The phosphor excited with the light ray flux BLs emits fluorescence (yellow light) YL having a peak wavelength in a wavelength region, for example, from 500 to 700 nm. An antireflection film (AR-coat film, for example) that is not shown is formed on the surface of the phosphor layer 34.

A surface of the phosphor layer 34 or the surface opposite the side on which the light ray flux BLs is incident is fixed to the support 35 via the fixing member 36. The reflector 37 reflects the component that travels toward the support 35 out of the components of the fluorescence YL produced by the phosphor layer 34.

Part of the fluorescence YL produced by the phosphor layer 34 is reflected off the reflector 37 and exits out of the phosphor layer 34. The reflector 37 preferably has high reflectance, and an Ag film is therefore used as the reflector 37 in the present embodiment.

The other part of the fluorescence YL produced by the phosphor layer 34 exits out of the phosphor layer 34 without involved with the reflector 37. The fluorescence YL is thus emitted from the phosphor layer 34.

The support 35 preferably excels in heat conductivity, and a copper plate is therefore used as the support 35 in the present embodiment. The support 35 in the present embodiment is formed, for example, of a copper plate having a 10-mm square shape in a plan view and a thickness of 3 mm. The fixing member 36 is made of a material having high heat conductivity, for example, solder and silver paste.

The illuminator 2 according to the present embodiment, in which the afocal system (convex lens 23a) is so cooled that the temperature thereof is kept at a predetermined temperature, allows the light ray flux BL (light rays B1 and B2) to be incident on the polarization separation element 50 with the disturbance of the polarization state of the light ray flux BL reduced. That is, the illuminator 2 can control the polarization ratio of the light ray flux BL incident on the polarization separation element 50 at a fixed value.

The light ray flux BLs separated by the polarization separation element 50 therefore produces a predetermined quantity of fluorescence YL. The fluorescence YL passes through the first light collection system 26 and is then incident on the polarization separation element 50. The fluorescence YL then passes through the polarization separation element 50 and enters the optical integration system 31.

On the other hand, the P-polarized light ray flux BLp separated by the polarization separation element 50 from the light ray flux BL is incident on the retardation film 28. The retardation film 28 is formed of a quarter-wave plate disposed in the optical path between the polarization separation element 50 and the diffusive reflection element 30. The P-polarized light ray flux BLp having exited out of the polarization separation element 50 is converted by the retardation film 28, for example, into right-handed circularly polarized blue light BLc1 and then enters the second light collection system 29. The second light collection system 29 causes the blue light BLc1 to be incident in the form of collected light on the diffusive reflection element 30.

The diffusive reflection element 30 diffusively reflects the blue light BLc1 having exited out of the second light collection system 29 toward the polarization separation element 50. The diffusive reflection element 30 is preferably an element that reflects the blue light BLc1 in the Lambertian reflection scheme but does not disturb the polarization state of the blue light BLc1.

The light diffusively reflected off the diffusive reflection element 30 is hereinafter referred to as blue light BLc2. The present embodiment, in which the blue light BLc1 is diffusively reflected, allows generation of blue light BLc2 having a roughly uniform illuminance distribution. For example, the right-handed circularly polarized blue light BLc1 is reflected as left-handed circularly polarized blue light BLc2.

The blue light BLc2 is converted by the second light collection system 29 into parallelized light and then incident on the retardation film 28 again.

The left-handed circularly polarized blue light BLc2 is converted by the retardation film 28 into S-polarized blue light BLs1. The S-polarized blue light BLs1 is reflected off the polarization separation element 50 toward the optical integration system 31.

According to the present embodiment, in which the polarization separation element 50 separates the light ray flux BLp from the light ray flux BL, predetermined blue light BLs1 can be produced.

As a result, the blue light BLs1 is used, along with the fluorescence YL having passed through the polarization separation element 50, to form the illumination light WL. That is, the blue light BLs1 and the fluorescence YL are caused to exit out of the polarization separation element 50 in the same direction to produce the white illumination light WL, which is the mixture of the blue light BLs1 and the fluorescence (yellow light) YL. The white balance of the thus produced illumination light WL is kept constant.

The illumination light WL is caused to travel toward the optical integration system 31. The optical integration system 31 is formed, for example, of a first lens array 31a and a second lens array 31b. The first lens array 31a and the second lens array 31b are each formed of a plurality of lenslets arranged in an array.

The illumination light WL having passed through the optical integration system 31 is incident on the polarization conversion element 32. The polarization conversion element 32 is formed of polarization separation films and retardation films. The polarization conversion element 32 converts the illumination light WL, which contains the non-polarized fluorescence YL, into linearly polarized light.

The illumination light WL having passed through the polarization conversion element 32 is incident on the superimposing lens 33a. The superimposing lens 33a cooperates with the optical integration system 31 to homogenize the illuminance distribution of the illumination light WL in an illuminated area. The illuminator 2 thus produces the illumination light WL.

The illuminator 2 according to the present embodiment, in which the afocal system (convex lens 23a) is so cooled that the temperature thereof is kept at a predetermined temperature, allows reduction in the disturbance of the polarization state of the light ray flux BL that occurs when the light ray flux BL passes through the convex lens 23a. As a result, the light ray flux BL incident on the afocal system 23 (convex lens 23a) is incident on the polarization separation element 50 with the polarization ratio between the S-polarized light (light ray flux BLs) and the P-polarized light (light ray flux BLp) kept constant.

The thus configured illuminator 2 according to the present embodiment, which employs the simple configuration in which the convex lens 23a is cooled, can control the polarization ratio of the light incident on the polarization separation element 50 (light ray flux BL) at low cost. The cost of the projector 1 including the thus configured illuminator 2 can therefore be reduced.

Further, the illuminator 2 according to the present embodiment, in which the temperature adjuster 40 is controlled based on the white balance of the illumination light WL, can control the temperature of the convex lens 23a with accuracy. Moreover, the illuminator 2 can produce the illumination light WL having white balance kept constant. The projector 1 including the thus configured illuminator 2 can therefore project an image that excels in the color balance on the screen SCR.

Second Embodiment

An illuminator according to a second embodiment will be subsequently described. In the following description, configurations and members common to those in the first embodiment have the same reference characters, and detailed descriptions of the common configurations and members will be omitted or simplified.

Figure 5:
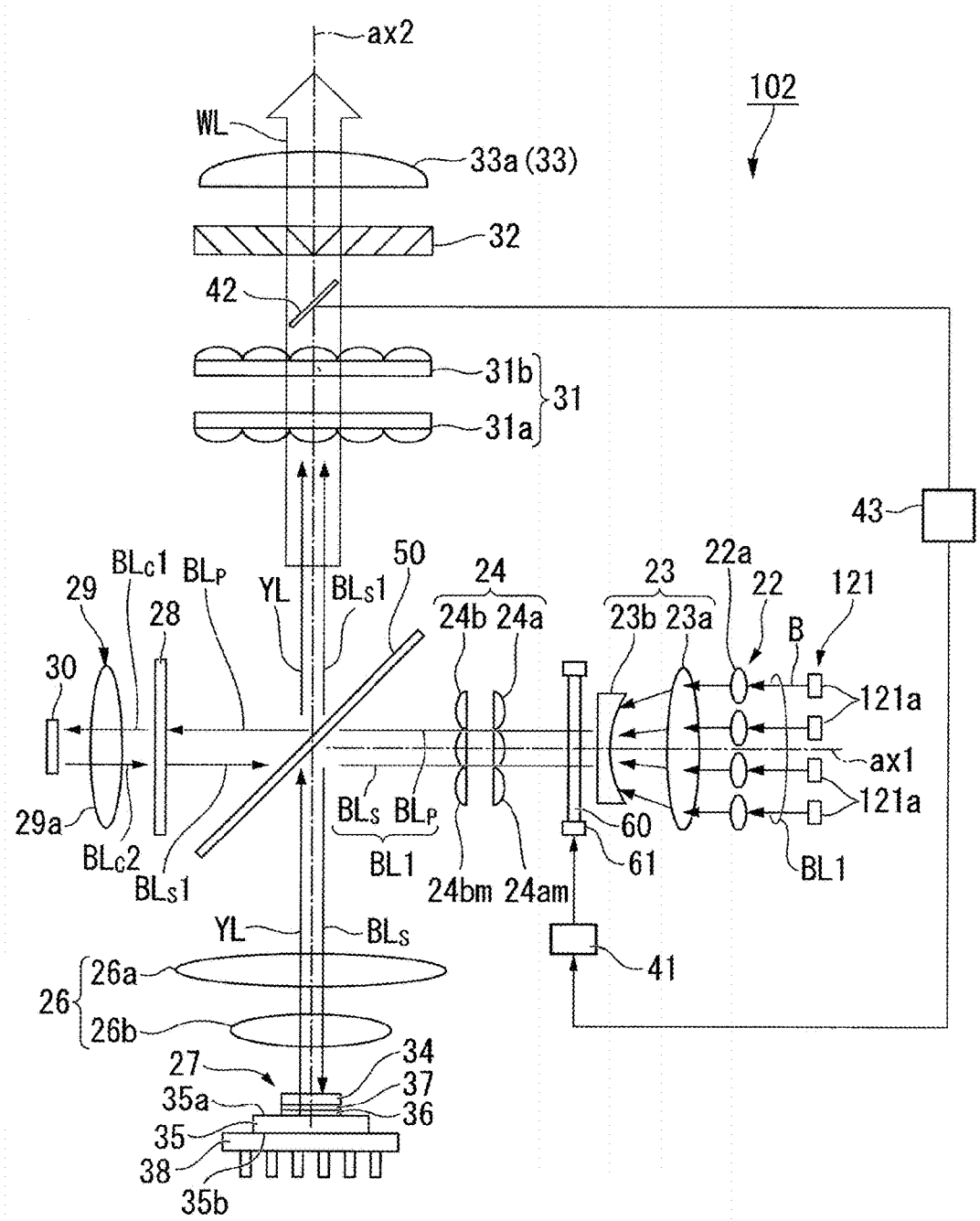
FIG. 5 shows a schematic configuration of an illuminator according to a second embodiment.

FIG. 5 shows a schematic configuration of an illuminator 102 according to the present embodiment. The illuminator 102 includes an array light source 121, the collimator system 22, the afocal system 23, a glass plate 60, the homogenizer system 24, the polarization separation element 50, the first light collection system 26, the fluorescence emitting element 27, the retardation film 28, the second light collection system 29, the diffusive reflection element 30, the optical integration system 31, the polarization conversion element 32, and the superimposing lens 33a, as shown in FIG. 5. In the following description, it is assumed that no disturbance of the polarization state of the light ray flux BL occurs in the afocal system 23 in the present embodiment.

The array light source 121 includes a plurality of semiconductor lasers 121a. The plurality of semiconductor lasers 121a are arranged in an array in a plane perpendicular to the optical axis ax1. The semiconductor lasers 121a each emit, for example, a blue light ray B (laser beam having a peak wavelength of 460 nm, for example). In the present embodiment, the light ray B emitted from each of the semiconductor lasers 121a is linearly polarized light (light formed of P-polarized light component with respect to polarization separation element 50).

The array light source 121 in the present embodiment outputs a light ray flux BL1 formed of the plurality of light rays B. The light ray flux BL1 is formed of light containing the P-polarized light component (light rays B), unlike the light ray flux BL in the first embodiment. In the present embodiment, the array light source 121 corresponds to the "light source" in the appended claims, and the light ray flux BL1 corresponds to the "light containing a predetermined polarized light component" in the appended claims.

The light ray flux BL1 outputted from the array light source 121 is incident on the glass plate 60 via the collimator system 22 and the afocal system 23.

The present inventor has found based on a result of a simulation described later that changing a temperature difference that occurs in the glass plate 60 allows a phase difference produced in the glass plate 60 to be controlled.

Figure 6:
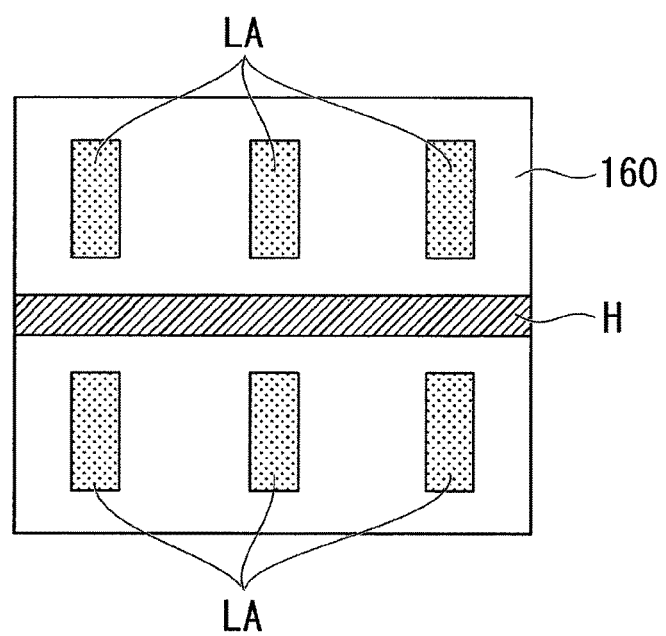
FIG. 6 shows a glass plate used in a simulation.

FIG. 6 shows a glass plate 160 used in the simulation. The glass plate 160 has a rectangular shape, and a heater H is so disposed in the glass plate 160 as to be located in a central portion thereof in the width direction and along the longitudinal direction thereof, as shown in FIG. 6. Six laser beams LA each formed of linearly polarized light were caused to be incident on the glass plate 160, and a change in the polarization ratio of each of the laser beams LA that occurs when the glass plate 160 was heated was determined.

Figure 7:
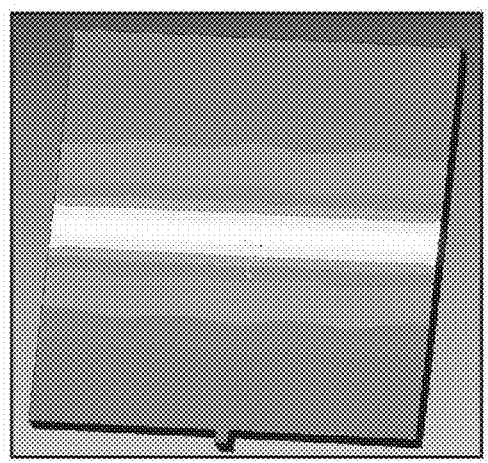
FIG. 7 shows a result of a simulation of the temperature distribution obtained when a glass plate is heated with a heater.
Figure 8:
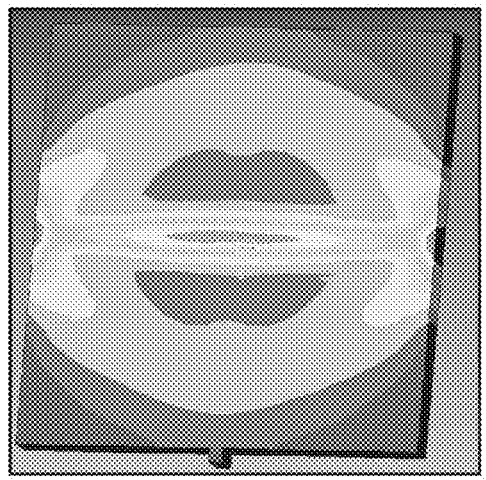
FIG. 8 shows a result of a simulation of internal stress induced in the glass plate.

FIG. 7 shows a result of a simulation of the temperature distribution obtained when the glass plate 160 was heated with the heater H. FIG. 8 shows a result of a simulation of internal stress induced in the glass plate 160 when the glass plate 160 is heated with the heater H.

It is ascertained as shown in FIGS. 7 and 8 that when a temperature difference occurs in the glass plate 160 when the glass plate 160 is heated by the heater H, internal stress is induced in the glass plate 160.

Figure 9:
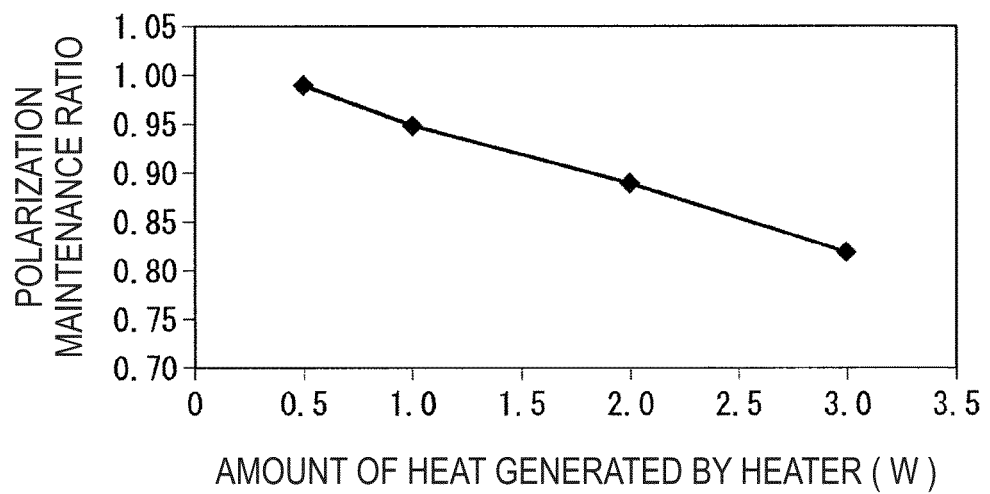
FIG. 9 is a graph showing the relationship between a polarization maintenance ratio in the glass plate and the amount of heat generated by the heater.

FIG. 9 is a graph showing the relationship between a polarization maintenance ratio representing how much the polarization state of any of the laser beams LA having passed through the glass plate 160 is maintained and the amount of heat generated by the heater. In FIG. 9, the horizontal axis represents the amount of heat (unit: W) generated by the heater H, and the vertical axis represents the polarization maintenance ratio in the laser beam LA. The polarization maintenance ratio in the laser beam LA is the ratio between the polarization ratios before and after the laser beam LA passes through the glass plate 160, and a polarization maintenance ratio of 1 means that the polarization ratio does not change before and after the laser beam LA passes through the glass plate 160 (no polarization rotation occurs).

It is ascertained that the polarization maintenance ratio decreases as the amount of heat generated by the heater H increases, as shown in FIG. 9. That is, it is ascertained that increasing the temperature of the glass plate 160 increases the internal stress and hence the phase difference imparted to the laser beam LA increases.

The illuminator 102 according to the present embodiment, in which a temperature difference is produced in the glass plate 60 based on the result of the simulations described above, can control the polarization ratio in the glass plate 60. The polarization ratio in the glass plate 60 corresponds to the ratio between the S-polarized light component and the P-polarized light component in the light having passed through the glass plate 60 (light ray flux BL1). In the present embodiment, the glass plate 60 corresponds to the "optical element" in the appended claims.

Specifically, the illuminator 102 according to the present embodiment includes a temperature adjuster 61 and the controller 41. The temperature adjuster 61 is formed, for example, of a heating device, such as a heater. The temperature adjuster 61 is not limited to a heater and may be formed, for example, of a Peltier device having a heating function and a cooling function.

In the present embodiment, the temperature adjuster 61 produces a temperature difference in the glass plate 60 by heating the glass plate 60. The glass plate 60 in which a temperature difference is produced has internal stress induced therein. The internal stress produces a phase difference in the glass plate 60. The phase difference produced in the glass plate 60 is calculated from the product of the elastic coefficient of the glass plate 60, the thickness of the glass plate 60, and the internal stress.

Since the light ray flux BL1 (light rays B) is linearly polarized light, appropriately setting the internal stress (phase difference) in the glass plate 60 allows conversion of the light ray flux BL1 into light containing the S-polarized light component and the P-polarized light component with respect to the polarization separation element 50 mixed with each other at a predetermined ratio. That is, the temperature adjuster 61 can control the polarization ratio of the light ray flux BL1 incident on the polarization separation element 50 by appropriately controlling the temperature of the glass plate 60.

In the illuminator 102 according to the present embodiment, the controller 41 operates the temperature adjuster 61 based on the signal from the sensor unit 43 (result of detection of color balance). That is, the temperature adjuster 61 adjusts the temperature of the glass plate 60 based on the detection signal from the sensor unit 43.

The temperature adjuster 61 controls the polarization ratio of the light ray flux BL1 passing through the glass plate 60 by adjusting the temperature of the glass plate 60 in such a way that a predetermined white balance is achieved. Specifically, in a case where the controller 41 determines based on the detection signal from the sensor unit 43 that the white balance of the illumination light WL has changed, the controller 41 drives the temperature adjuster 61 in such a way that a temperature difference (internal stress) that produces a phase difference that achieves the predetermined white balance is produced in the glass plate 60.

The illuminator 102 according to the present embodiment, in which the temperature adjuster 61 produces a temperature difference in the glass plate 60, can simply control the polarization ratio of the light ray flux BL1 passing through the glass plate 60. Cost reduction can therefore achieved as compared with the configuration of related art in which a rotatable half-wave plate is used to control the polarization ratio.

Further, the illuminator 102 according to the present embodiment can radiate the illumination light WL having a fixed white balance, as in the first embodiment. The projector including the illuminator 102 can therefore project an image that excels in the color balance.

The invention is not limited to the contents of the embodiments described above and can be changed as appropriate to the extent that the change does not depart from the substance of the invention.

For example, in the first embodiment described above, the case where only the convex lens 23a of the afocal system 23 is cooled is presented by way of example. Instead, the concave lens 23b may also be cooled.

Figure 10:
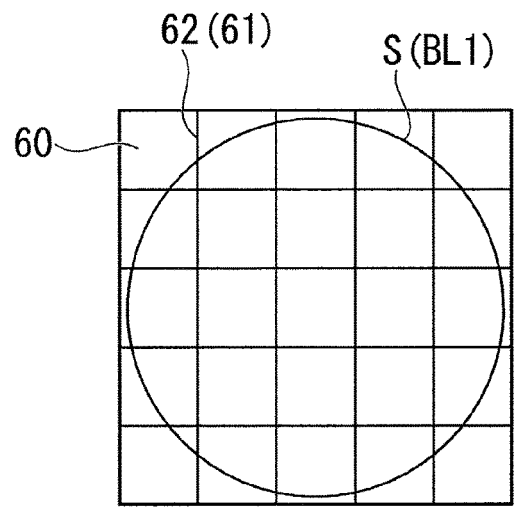
FIG. 10 shows the configuration of a temperature adjuster according to a variation.

The temperature adjuster 61 in the second embodiment described above may instead employ a configuration in which the light incident area of the glass plate 60 is divided into a plurality of areas and the temperatures of the divided areas are selectively adjusted. FIG. 10 shows the configuration of the temperature adjuster 61 according to a variation. The temperature adjuster 61 is formed of a plurality of heating wires 62 disposed in a matrix in a light incident area S of the glass plate 60, as shown in FIG. 10. The light incident area S is divided into a plurality of areas by the heating wires 62. The temperature adjuster 61 can, for example, selectively apply voltage to the plurality of heating wires 62 to selectively heat, out of the light incident area S, only the area surrounded by the heating wire 62 to which the voltage is applied.

In the second embodiment described above, the case where the light ray flux BL1 outputted from the array light source 121 is light containing only the P-polarized light component has been presented by way of example. The light ray flux BL1 may instead be light containing the P-polarized light component and the S-polarized light component, as in the case of the light ray flux BL in the first embodiment.

In the embodiments described above, the fluorescence emitting element 27 is a stationary element. Instead, a rotatable element in which the support 35, which supports the phosphor layer 34, is rotated may be employed. Similarly, the diffusive reflection element 30 is a stationary element in the embodiments described above, and a rotatable element may instead be employed.

In the embodiments described above, the projector 1 including the three light modulators 4R, 4G, and 4B is presented by way of example. Instead, the invention is also applicable to a projector that displays color video images via a single light modulator. Further, a digital mirror device may be used as each of the light modulators.

In the embodiments described above, the case where the illuminator according to any of the embodiments of the invention is incorporated in a projector is presented by way of example, but not necessarily. The illuminator according to any of the embodiments of the invention may be used with a lighting apparatus, a headlight of an automobile, and other apparatus.

The entire disclosure of Japanese Patent Application No. 2017-060592, filed on Mar. 27, 2017 is expressly incorporated by reference herein.

What is claimed is:

1. An illuminator comprising:
   a light source that emits light containing a predetermined polarized light component and that comprises a plurality of semiconductor lasers;
   an optical element that transmits the light emitted from the light source;
   a polarization separation element on which the light having passed through the optical element is incident and which performs polarization separation on the incident light;
   a homogenizer system on which the light transmitted by the optical element is incident, the homogenizer system homogenizing an illuminance distribution with respect to the light and separating the optical element from the polarization separation element;
   a temperature adjuster that adjusts a temperature of the optical element;
   a light detector that detects a color balance of illumination light; and
   a controller that controls the temperature adjuster based on a result of the detection of color balance performed by the light detector.

2. The illuminator according to claim 1,
   wherein the temperature adjuster is a fan, and
   the fan cools the optical element in such a way that the temperature thereof is kept at a predetermined temperature.

3. The illuminator according to claim 1,
   wherein the temperature adjuster controls a polarization ratio in the optical element by producing a temperature difference in the optical element.

4. A projector comprising:
   the illuminator according to claim 1;
   a light modulator that modulates light from the illuminator in accordance with image information to produce image light; and
   a projection system that projects the image light.

5. A projector comprising:
   the illuminator according to claim 2;
   a light modulator that modulates light from the illuminator in accordance with image information to produce image light; and
   a projection system that projects the image light.

6. A projector comprising:
   the illuminator according to claim 3;
   a light modulator that modulates light from the illuminator in accordance with image information to produce image light; and
   a projection system that projects the image light.

7. The illuminator according to claim 1,
   wherein the optical element constitutes part of an afocal system.

8. The illuminator according to claim 7,
   wherein the optical element is a convex lens.

9. The illuminator according to claim 1, further comprising:
   a fluorescence emitting element on which one light separated by the polarization separation element is incident; and
   a diffusive element on which another light separated by the polarization separation element is incident,
   wherein the illumination light includes a fluorescence emitted from the fluorescence emitting element and a diffused light emitted from the diffusive element.

10. The illuminator according to claim 9, wherein the homogenizer system homogenizes an illuminance distribution of the one light incident on the fluorescence emitting element.

11. The illuminator according to claim 9, wherein the homogenizer system homogenizes an illuminance distribution of the other light incident on the diffusive element.

12. A projector comprising:
    the illuminator according to claim 7;
    a light modulator that modulates light from the illuminator in accordance with image information to produce image light; and
    a projection system that projects the image light.

13. A projector comprising:
    the illuminator according to claim 8;
    a light modulator that modulates light from the illuminator in accordance with image information to produce image light; and
    a projection system that projects the image light.

14. A projector comprising:
    the illuminator according to claim 9;
    a light modulator that modulates light from the illuminator in accordance with image information to produce image light; and
    a projection system that projects the image light.

15. A projector comprising:
    the illuminator according to claim 10;
    a light modulator that modulates light from the illuminator in accordance with image information to produce image light; and
    a projection system that projects the image light.

16. A projector comprising:
the illuminator according to claim 11;
a light modulator that modulates light from the illuminator in accordance with image information to produce image light; and
a projection system that projects the image light.

* * * * *